April 21, 1970 J. C. PRISCU Re. 26,861

ELECTROLYTIC CELL FOR THE PRODUCTION OF TITANIUM

Original Filed May 20, 1963 3 Sheets-Sheet 1

INVENTOR.
John C. Priscu
BY
Clement L. Wilson
Agent

ELECTROLYTIC CELL FOR THE PRODUCTION OF TITANIUM

Original Filed May 20, 1963 3 Sheets-Sheet 2

INVENTOR.
John C. Priscu
BY
Agent

ELECTROLYTIC CELL FOR THE PRODUCTION OF TITANIUM

Original Filed May 20, 1963 3 Sheets-Sheet 3

INVENTOR.
John C. Priscu
BY
Agent

United States Patent Office

Re. 26,861
Reissued Apr. 21, 1970

26,861

ELECTROLYTIC CELL FOR THE PRODUCTION OF TITANIUM

John C. Priscu, Las Vegas, Nev., assignor to Titanium Metals Corporation of America, New York, N.Y., a corporation of Delaware Original No. 3,282,822, dated Nov. 1, 1966, Ser. No. 281,709, May 20, 1963, which is a continuation-in-part of application Ser. No. 197,958, May 28, 1962. Application for reissue May 31, 1967, Ser. No. 646,758
Int. Cl. C22d *3/00, 3/02*
U.S. Cl. 204—246 12 Claims

Matter enclosed in heavy brackets [ ] appears in the original patent but forms no part of this reissue specification; matter printed in italics indicates the additions made by reissue.

*ABSTRACT OF THE DISCLOSURE*

*A cell for use with a fused halide salt bath including a container for holding the salt bath which may be closed to exclude the ambient atmosphere. A cathode assembly positioned within the container having a hollow structure and a plurality of vertical rods located within the structure and spaced from the sidewalls thereof and from one another. A feed pipe extending within the structure and spaced from the sidewalls thereof and from the rods. A plurality of vertical anode rods located within the container exteriorly of the cathode assembly and spaced from the sidewalls of the container and the walls of the hollow structure. An electrical connection between the cathode assembly and the negative pole of a current source and between the anode rods and a positive pole of the current source.*

This is a continuation-in-part of application Ser. No. 197,958, filed May 28, 1962, *now abandoned.*

This invention relates to the production of metallic titanium by electrolysis of a titanium chloride in a fused salt bath, and more particularly to improvements in an electrolytic cell useful in such a process.

Difficulties have been encountered in electrolytic production of titanium metal due to formation of the titanium metal product as crystals of undesirable shape and size. It is apparently necessary for most efficient production of titanium by fused salt electrolysis that the product crystals be individually solid, of relatively uniform size and shape, which have grown by attachment to each other into a dendritic structure with intermeshing branches and clusters. When the titanium product is composed substantially wholly, or at least in major part, of such crystal structure, required purity of the product titanium will be obtained; and the product will be best adapted for later processing including separation of electrolyte salts and compacting into electrodes for melting.

Fine powdery crystals of titanium are undesirable because *the* ratio of surface area to weight is [so] high and they are therefore very susceptible to oxidation during any stage of processing. Surface oxidation can result in increased oxygen content of the metal rendering it brittle and useless or in the case of extremely fine particles, can result in substantially complete oxidation of the entire crystal. Needles which are very fine, that is of extremely small diameter, are also considered undesirable since their surface areas will also be extremely high resulting in a deleterious tendency toward oxidation. Such fine needles or fine crystals may grow to form a solid, sponge structure with very fine pores from which it is extremely difficult to efficiently remove electrolyte salts. Crystals grown individually to large size to form solid, large masses are generally pure and their relative surface area is low but such masses have little [cohension] *cohesion* when compacted together and they are thus unsuited for pressing into compacts which are later constructed into consumable electrodes for melting. Therefore, it is most desirable that electrolytic titanium be produced in the form of solid crystals intergrown to form a dendritic structure as previously described. Such crystals will not be so fine as to be readily oxidized, electrolyte salts may readily be separated as by leaching from the crystal aggregates, and the intermeshing branches and clusters of the dendrites provide a strong cohesive structure when formed by pressing into compacts.

My invention stems from the discovery that the uniformity and concentration of electric current flowing from and to various elements of the electric cell are largely responsibe for the crystalline type and size and structure of *the* titanium deposit obtained. It has been found that good control of current densities are required to form the particularly desirable type of crystal structure, and that the current flows from and to the anode and cathode elements must be as near as possible uniform over the electrode surfaces.

Summarized briefly, the electrolytic cell of this invention comprises a closed container for the electrolyte, which is composed of a fused halide salt. The [box-like] cathode structure [of square horizontal section and] having perforated sides and imperforate top and bottom is suspended in the container so as to be immersed in the electrolyte. Within this cathode *structure* [box] are arranged a central [titanium tetrachloride] feed pipe having an outlet near its lower end, and a plurality of vertical electrically conductive rods which act as cathodic surfaces for deposition of titanium metal. The cathode rods are arranged symmetrically within the cathode *structure* [box], being [equally] spaced from the center [of the box] and *from one another* [equally spaced each from its neighbor]. Also immersed in the electrolyte and surrounding the cathode *structure* [box] but spaced apart therefrom are a plurality of preferably round anode rods. [These anode rods are symmetrically aligned facing the four sides of the cathode box with a plurality of anode rods in each line facing each side of the cathode box.] A vent is arranged to provide egress from the cell of chlorine produced as a by-product of the electrolysis, and means are provided for connecting electric current to the anode rods, and to the cathode *structure* [box] and in turn to the cathode rods.

The *sides of the* [square] cathode *structure* [box provides uniform spacing between its sides,] and the *spaced* [symmetrical arrangement of the] cathode rods within provide [s] [uniformly] spaced [and arranged] surfaces for deposition of titanium metal. The surfaces presented by the cathode rods result[s] in areas of uniformly controlled current density for deposition of *metallic titanium* crystals of the most desirable type. The curvate surfaces of the round cathode rods provide even current distribution over these surfaces *which* [and] eliminates corner effects which cause high concentration of current at edges and corners of, for example, a sheet or plate. The anode design in the form of a plurality of rods as described results in high current density anode surfaces [symmetrically arranged with respect to the sides of the cathode box which they face and the cathode rods inside]. Their curvate surfaces also provide uniform current flow over these surfaces eliminating corner effects.

These and other novel features of the electrolytic cell of this invention will be more clearly understood from the following description and the annexed drawings in which.

Figure 1:
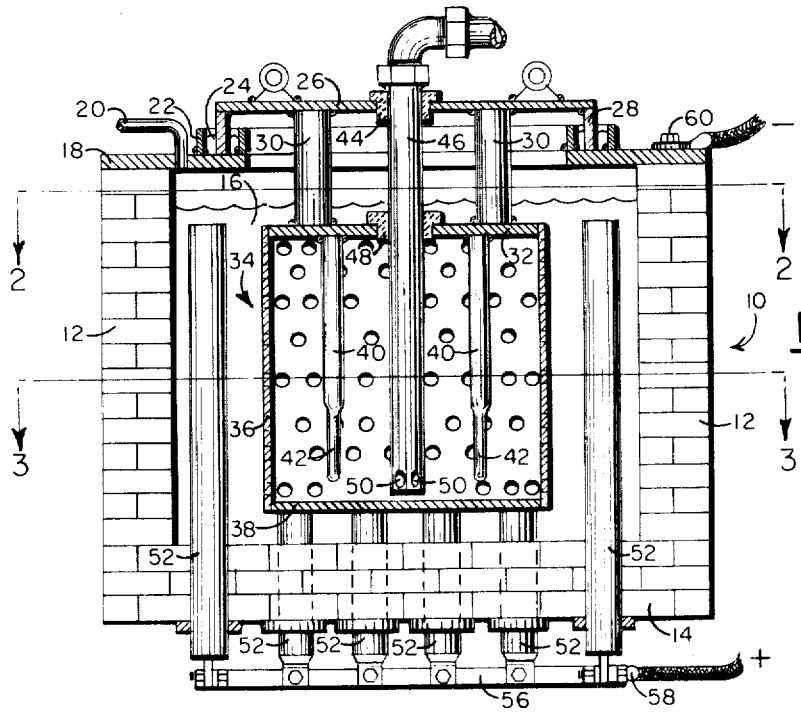
FIG. 1 is a central vertical section of an electrolytic cell embodying features of this invention.
Figure 2:
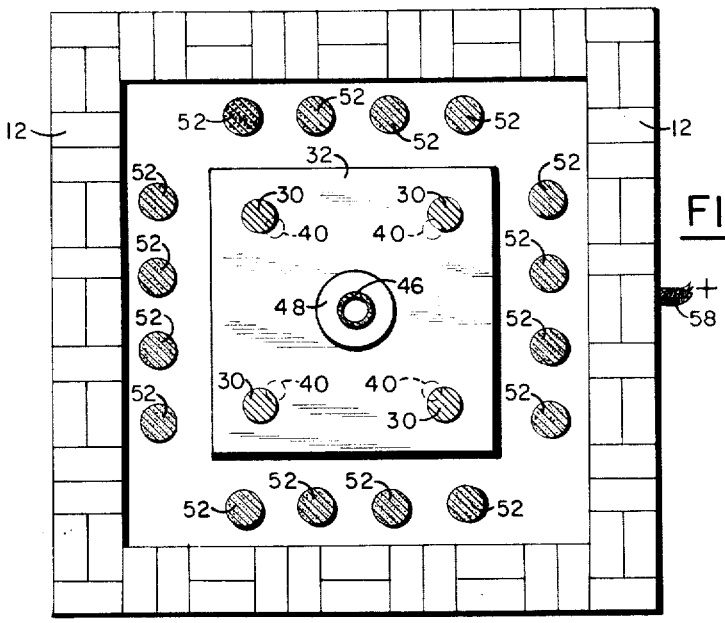
FIG. 2 is a horizontal section of the cell shown in vertical section in FIG. 1 and taken along the line 2—2.

Referring now particularly to FIG. 1 the cell comprises a container 10 of which the sidewalls 12 and the bottom 14 are preferably fabricated of refractory brick, at least the innermost course of which being of material to resist corrosive effects of the fused halide electrolyte 16. The top of container 10 is closed by cover 18 through which is provided chlorine vent pipe 20. Surrounding a central aperture in cover 18 is channel 22 which contains a liquid sealing metal 24 which may be of a lead or tin alloy having a low melting point. Cathode top plate 26 is provided with depending flange 28 around its outer edge which fits into channel 22 forming a joint which is sealed by the liquid metal 24. Fixedly attached to the underside of plate 26 are support bars 30 which at their lower ends are fixedly attached to top 32 of cathode *structure* [box] 34 to suspend it in container 10. As will be seen from FIG. 2, cathode *structure* [box] 34 is of square horizontal section *and the structure is termed a box in the description of the illustrated embodiments. While the cathode structure is shown as square in horizontal section, it should be understood that the structure may have other geometric configurations in horizontal section.* Sides 36 of cathode box 34 are perforated overall while its bottom 38 as well as its top 32 are essentially imperforate.

Figure 7:
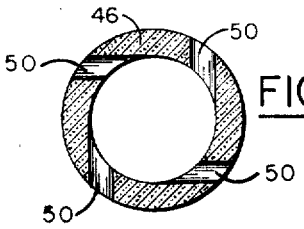
FIG. 7 is an enlarged horizontal section of the [$TiCl_4$] feed pipe showing the outlets near its bottom.

Fixedly attached to the underside of the top 32, and suspended thereby inside cathode box 34, are vertical cathode rods 40 which are of round horizontal section. Cathode rods 40 are fabricated of electrically conductive material such as steel as are also the sides, top and bottom of cathode box 34, its supporting bars 30, plate 26 and container cover 18. Cathode rods 40 are preferably provided with a reduced diameter lower end portion as at 42 to provide more uniform current distribution over their length. The lower end portion 42 is preferably about one-half the diameter of the main body or upper part of cathode rod 40, and will extend up to one-third of the total length of cathode rod 40. Their lower ends are preferably rounded as shown and the shoulders at the tops of lower end portions 42 are also rounded to eliminate sharp corners and to promote uniform current flow. Supported by plate 26 and with its passage therethrough insulated as by ceramic bushing 44, is [*titanium tetrachloride*] feed pipe 46 preferably of graphite which intrudes centrally into cathode box 34 with its passage through the top 32 thereof insulated by ceramic bushing 48. Near the bottom of [$TiCl_4$] feed pipe 46, which extends close to the bottom 38 of cathode box 34, are arranged tangential outlets 50, illustrated in detail in FIG. 7.

Passing through the bottom 14 of container 10 and upward into its interior so as to be immersed in electrolyte 16 are anode rods 52 preferably fabricated of graphite and of round cross section.

Figure 3:
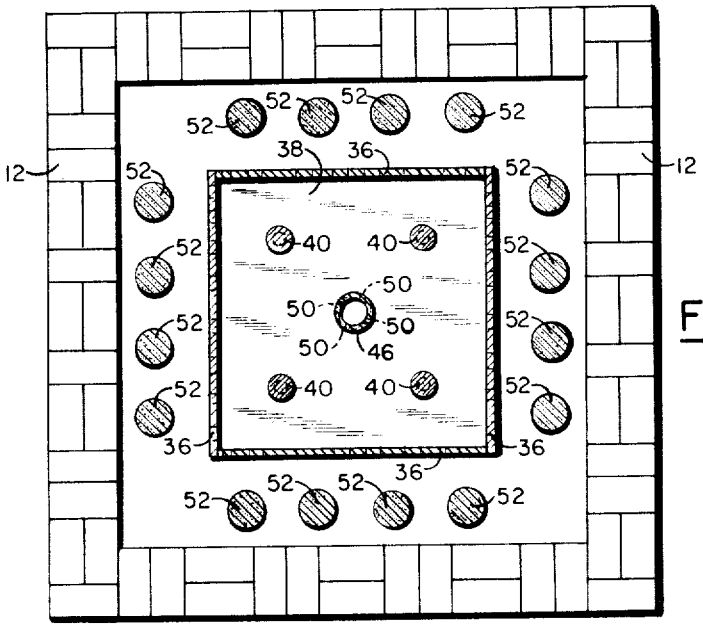
FIG. 3 is a horizontal section of the same cell taken along the line 3—3.

FIG. 3 shows more clearly the symmetrical arrangement of the cathode and anode elements of the cell. It will be seen that the four cathode rods 40 are arranged symmetrically with respect to the center of the area defined by the sides 36 of cathode box 34, being equally spaced from the central [$TiCl_4$] feed pipe 46 and equally spaced each from its neighbor. It will also be seen that the anode rods 52 are symmetrically aligned with a plurality of such rods (four in the embodiment illustrated) in each line facing each side 36 of cathode box 34 and uniformly spaced apart therefrom.

Figure 4:
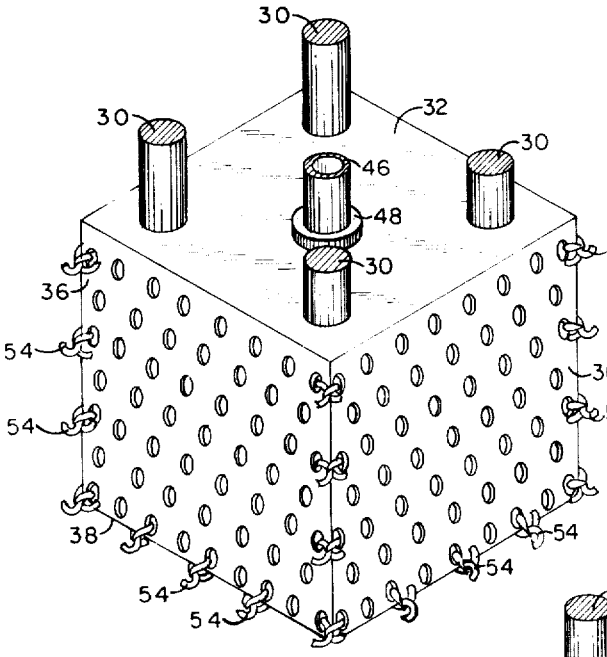
FIG. 4 is a more detailed perspective view of the cathode *structure* [box].
Figure 5:
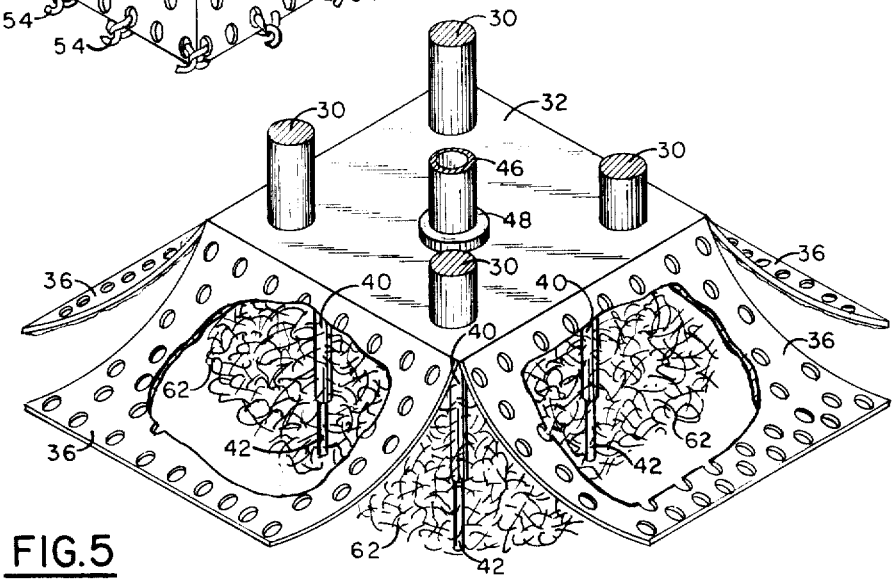
FIG. 5 is a perspective view of the cathode *structure* [box] of FIG. 4 opened for product metal removal.

FIGS. 4 and 5 show more clearly details of construction of cathode box 34. As seen in FIG. 4, the perforated sides 36 are fixedly attached as by welding to top 32 and are held in juxtaposition along their vertical edges by wire ties 54. Bottom 38 is also attached to the bottom edges of sides 36 by similar wire ties 54. At the end of a production cycle and after cathode box 34 has been removed from container 10 and cooled, wire ties 54 are cut, bottom 38 is dropped and sides 36 are bent outwardly and upwardly as shown in FIG. 5. With the interior of cathode box 34 exposed, titanium crystals 62 deposited on cathode rods 40 may be readily harvested.

The bottoms of anode rods 52, exterior of container 10 are connected to a common bus 56 to which may be connected, as at 58, the positive pole of a source of direct electric current (not shown). The negative pole of such current source may be connected by terminal 60 to cover 18 through which current connection is made to cathode top plate 26, support bars 30 and to cathode box top 32 which is connected to cathode box sides 36 as well as cathode rods 40.

Figure 6:
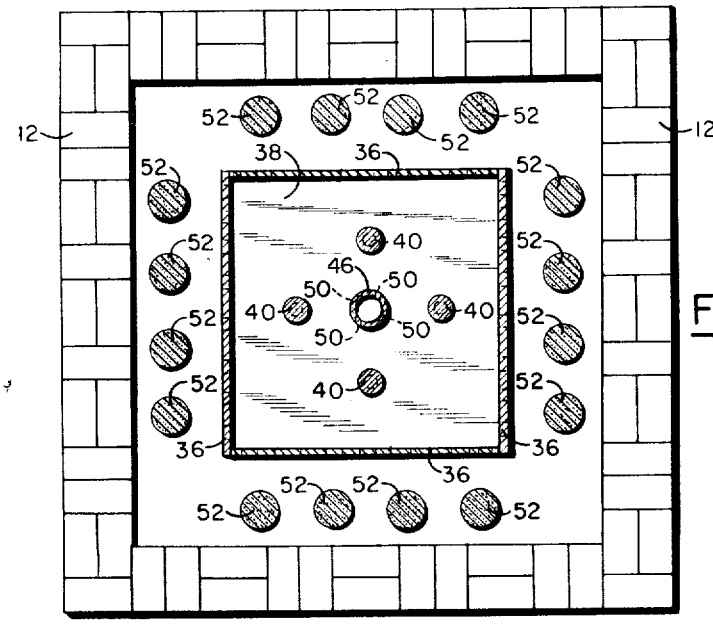
FIG. 6 is a horizontal section corresponding to the view shown in FIG. 3 but of a cell having a modified arrangement of the cathode rods.

FIG. 6 shows a modified arrangement of the cathode rods 40 and presents a view otherwise corresponding to that of FIG. 3. Cathode rods 40 are arranged symmetrically and evenly spaced as before but in this embodiment are located each opposite the center of an adjacent side 36 instead of being situated near the corners formed by the joints of the sides 36 as illustrated in FIG. 3.

The proportion of current flowing to the elements of the cathode assembly will depend largely on the cross sectional area of these structures. Thus the total horizontal cross sectional area of cathode box sides 36 should be so related to the total cross sectional area of cathode rods 40 to provide current distribution as desired. These cross sectional areas should be taken near the juncture of these elements with top 32 of the cathode box. It will be found advantageous to provide for greater current flow to the cathode rods 40 than to box sides 36 and I have found a distribution of between 55 and 70% to the cathode rods 40 and the remainder to the box sides 36 to be effective.

In operation of the electrolytic cell of this invention, a suitable amount of fused halide salt bath 16 is placed in container 10 to serve as the electrolyte. The salt may be sodium chloride, or a eutectic mixture of sodium and potassium chlorides or other alkali or alkali metal chlorides. Access to the interior of container 10 is obtained by lifting plate 26 with suspended cathode box 34 being withdrawn out through the aperture in cover 18. After a sufficient amount of molten electrolyte has been placed in container 10, cathode box 34 is replaced in the cell with top plate flange 28 immersed in molten metal in channel 22, thus sealing the top of the cell and excluding the ambient atmosphere.

Direct current connections are made from a suitable power supply to the cover 18 by terminal 60 (and thus to the cathode assembly), and to the anodes at connector 58. *Feed* [$TiCl_4$ feed] pipe 46 is connected at its external end to a supply sources of $TiCl_4$, preferably in the form of vapor.

During the early stage of a production cycle, $TiCl_4$ is fed into [$TiCl_4$] feed pipe 46 at a slow rate and sufficient current is passed through the cell to provide a current density of between 180 and 300 amperes per square foot of cathode box side area. The $TiCl_4$ feed rate should be such to provide a ratio of 1 mol of $TiCl_4$ for each 10 to 20 faradays of current. This period of operation at low $TiCl_4$ to current input results in deposition of fine titanium crystals on the inside surfaces of the cathode box sides 36, these crystals growing together to produce a more or less solid sponge-like, but porous sheet which covers and bridges over the perforations in cathode box sides 36. When this has been accomplished, the $TiCl_4$ input rate is increased until the $TiCl_4$ to current ratio is about 1 mol $TiCl_4$ to 4.5 to 6.5 faradays of current. Under these conditions, a concentration of titanium dichloride will be produced and maintained in the electrolyte inside cathode box 34 and titanium metal will be deposited mostly on cathode rods 40 as desirable type crystals grown into intermeshing branches and clusters. When electrolysis has proceeded to a point where the assimilation of $TiCl_4$ has slowed down and the interior of cathode box 34 is substantially filled with titanium metal product, $TiCl_4$ feed is shut off, and current is maintained for a short period to strip soluble titanium from the electrolyte and then shut off.

The cathode assembly is then removed from the cell by lifting top plate 26 with suspended cathode box 34 from the cell and the cathode box 34 and its contents are allowed to cool, preferably in an inert atmosphere. Apparatus described in Patent No. 2,897,129 is useful for effecting transfer of the cathode box 34 to a cooling chamber and reloading of the cell with a new cathode assembly without exposure to air.

After cooling, the bottom 38 of cathode box 34 is detached and sides 36 bent up as shown in FIG. 5 and titanium crystals 62 removed from cathode rods 40 and generally from the cathode box 34 interior. The product crystals 62 are then leached with a dilute acid solution to wash off adhering electrolyte halide salts and then dried.

The entire product recovered from cathode box 34 will be found to be composed of at least 50% and more often 80% or more of the most desirable crystal structure previously described. Average over-all purity will be excellent and indicated by a Brinell hardness of about 120 to lower. This will include, of course, the sponge layer deposited on the sides 36 of cathode box 34 which will be of less purity and greater hardness than the material deposited on and outgrowing from cathode rods 40. I have found selected crystals of the type deposited on cathode *rods* [bars] 40 to be of extreme purity and of ductility as low as 80 Brinell. I have further tested the compacting properties of the type of titanium crystal product produced in *the* cathode *assembly* [box 34] and found that it can be readily compressed into compacts suited for fabrication into electrodes and such compacts were substantially stronger than those made by a similar pressing operation from sponge produced by the so-called Kroll process.

Placement of the anode rods, as described and illustrated, from the bottom of the cell up into the electrolyte is a unique and advantageous feature which helps to obtain uniform and even current flow. The cathode assembly is suspended from the top of the cell with its power connection through the top cover plate and suspending bars to the top of the cathode *structure* [box]. Therefore, due to resistance of the perforated sides of the cathode *structure* [box] and internal cathode rods, there is a voltage drop from top to bottom of the cathode structure. This voltage gradient would of itself tend to promote a greater flow of current between an anode and the top of the cathode [box] structure. In the case of anode rods arranged according to this invention, however, intruding into the cell from the bottom up and connected to the power supply at their bottoms, their voltage drop along their length is from their bottoms toward their tops. Therefore, the voltage drop in this cathode from the top down is compensated by the voltage drop in the anode rods from the bottom up, and a more even distribution of current flow results between the anode rods and the cathode structure in a vertical dimension.

I claim:

1. An electrolytic cell for production of metallic titanium by electrolysis of a titanium chloride contained in a fused halide salt bath comprising;

(a) a container adapted to hold a body of the fused salt of said bath and to exclude the ambient atmosphere therefrom;

(b) a cathode structure in the form of a four-sided closed box of square horizontal section suspended in the body of fused salt in said container, said cathode box having all four sides perforated and its top and bottom imperforate;

(c) a titanium tetrachloride feed pipe intruding centrally into said cathode box from the top thereof, terminating near the bottom of said cathode box and having an outlet near its lower end, (d) a plurality of cathode rods of circular horizontal section suspended inside said cathode by attachment to the top thereof said rods being spaced apart from the sides of said cathode box and from said $TiCl_4$ feed pipe and also being symmetrically arranged with respect to the center of said cathode box, (e) a plurality of anode rods of circular cross section immersed in said fused salt bath, said anode rods being symmetrically aligned facing the four sides of said cathode box but spaced apart therefrom and with a plurality of said anode rods in each line facing each side of said cathode box, (f) means for venting chlorine from said container, (g) means for connetcing the positive pole of a source of direct electric current to said anodes, and, (h) means for connecting the negative pole of such source of electric current to said cathode box.

2. An electrolytic cell for production of metallic titanium by electrolysis of a titanium chloride contained in a fused halide salt bath comprising;

(a) a container adapted to hold a body of said fused salt bath and having a cover to normally exclude the ambient atmosphere from the interior thereof, (b) a removable plate sealing an aperture in said cover, (c) a cathode box of square horizontal section suspended from said removable plate and immersed in the said body of said fused salt bath, said cathode box having all four sides perforated and its top and bottom imperforate, (d) a titanium tetrachloride feed pipe suspended from said removable plate and intruding centrally into said cathode box through the top thereof, and terminating near the bottom of said cathode box and having an outlet near its lower end, (e) a plurality of cathode rods of circular horizontal section suspended inside said cathode box by attachment to the top thereof said rods being spaced apart from the sides of said cathode box and from said $TiCl_4$ feed pipe and also being symmetrically arranged with respect to the center of said cathode box, (f) a plurality of anode rods of circular cross section immersed in said fused salt bath, said anode rods being symmetrically aligned facing the four sides of said cathode box but spaced apart therefrom and with a plurality of said anode rods in each line facing each side of said cathode box, (g) means for venting chlorine from said container, (h) means for connecting the positive pole of a source of direct electric current to said anodes, and, (i) means for connecting the negative pole of such source of electric current to the top of said cathode box,

3. An electrolytic cell according to claim 1 in which the said cathode rods number four and are arranged each facing a center of a side of said cathode box.

4. An electrolytic cell according to claim 1 in which the said cathode rods number four and are arranged each facing a corner of said cathode box.

5. An electrolytic cell according to claim 1 in which each of the said cathode rods is characterized by having a reduced diameter potrion extending from its bottom up to less than one-third of its length.

6. An electrolytic cell according to claim 5 in which the diameter of said reduced diameter portion of each of said cathode rods is about one-half the diameter of the remainder of each of said cathode rods.

7. An electrolytic cell according to claim 1 in which the said anode rods are arranged uniformly spaced apart in lines of four, each line of four being uniformly spaced from and facing one of the sides of said cathode box.

8. An electrolytic cell according to claim 1 in which the said cathode box is formed by fixedly attaching its sides to its top and removably attaching the corresponding edges of its sides together and removably attaching its bottom to the bottom edges of its sides, whereby said bottom may be detached from said sides and said sides from each other and said sides may be bent outwardly and upwardly to facilitate harvesting of titanium crystals deposited on said cathode rods in said cathode box.

9. An electrolytic cell according to claim 2 in which the said anode rods intrude upwardly into said cell passing through its bottom and are connected by their bottoms to the positive pole of said source of direct electric current.

*10. An electrolytic cell for use with a fused halide salt bath comprising:*

*(a) a container adapted to hold the fused salt bath and to exclude the ambient atmosphere therefrom;*

*(b) a cathode assembly positioned within said container for immersion in the fused salt bath, said cathode assembly including*

*(1) a closed structure with perforate sides and an imperforate top and bottom and*

*(2) a plurality of spaced rods of circular horizontal section attached to the top of said structure and depending into said structure, said rods being spaced from the sides of said structure;*

*(c) a feed pipe extending into said structure from the top thereof and having an outlet adjacent its lower end near the bottom of said structure;*

*(d) a plurality of anode rods of circular cross section extending into said container for immersion in the fused salt bath, said anode rods being spaced from the sides of said structure and from the sides of said container;*

*(e) means for venting gas from said container;*

*(f) means for connecting the positive pole of a source of direct electric current to said anode rods; and*

*(g) means for connecting the negative pole of the current source to said cathode assembly.*

*11. An electrolytic cell for use with a fused halide salt bath comprising:*

*(a) a container adapted to hold the fused salt bath and having a cover for excluding the ambient atmosphere from the interior thereof, said cover having an opening formed therethrough;*

*(b) a removable plate sealing said opening, said plate having an aperture formed therethrough;*

*(c) a cathode structure having top, bottom and perforate sidewalls suspended from said plate for immersion in the fused salt bath;*

*(d) a feed pipe extending through the aperture in said plate into said structure, said pipe terminating near the bottom wall of said structure and having an outlet adjacent its lower end;*

*(e) a plurality of spaced cathode rods of circular horizontal section attached to the top wall of said structure and depending into said structure, said rods being spaced from the side and bottom walls of said structure and from said feed pipe;*

*(f) a plurality of anode rods of circular cross section extending into said container for immersion in the fused salt bath, said anode rods being spaced from said structure;*

*(g) means for venting gas from said container;*

*(h) means for connecting the positive pole of a source of direct electric current to said anode rods; and*

*(i) means for connecting the negative pole of the current source to said cathode structure and said cathode rods.*

*12. An electrolytic cell for use with a fused halide salt bath comprising:*

*(a) a container adapted to hold the fused salt bath and having a cover for excluding the ambient atmosphere from the interior thereof;*

*(b) a cathode structure having top, bottom and perforate sidewalls positioned within said container for immersion in the fused salt bath;*

*(c) a feed pipe extending downwardly into said structure through said top, said pipe terminating near the bottom of said structure and having an outlet adjacent its lower end;*

*(d) a plurality of spaced cathode members attached to the top of said structure and depending into said structure, said cathode members being spaced from the sidewalls and the bottom of said structure and from said feed pipe;*

*(e) a plurality of elongated anode members extending into said container for immersion in the fused salt bath, said anode members being spaced from said structure and from the sides of said container;*

*(f) means for venting gas from said container;*

*(g) means for connecting the positive pole of a source of direct electric current to said anode members; and*

*(h) means for connecting the negative pole of the current source to said cathode structure and said cathode members.*

References Cited

The following references, cited by the Examiner, are of record in the patented file of this patent or the original patent.

UNITED STATES PATENTS

| | | | |
|---|---|---|---|
| 2,904,477 | 9/1959 | Opie et al. | 204—246 XR |
| 3,067,112 | 12/1962 | Trumpler | 204—246 XR |

JOHN H. MACK, Primary Examiner

D. R. VALENTINE, Assistant Examiner

U.S. Cl. X.R.

204—64, 247, 284